United States Patent [19]

Hodler

[11] 4,167,199
[45] Sep. 11, 1979

[54] TIMING DEVICE FOR PNEUMATIC SIGNALS

[75] Inventor: Karl Hodler, Büttikon, Switzerland

[73] Assignee: H. Kuhnke Elektrotechnik GmbH, Switzerland

[21] Appl. No.: 872,158

[22] Filed: Jan. 25, 1978

[30] Foreign Application Priority Data

Jan. 31, 1977 [DE] Fed. Rep. of Germany ....... 2703893

[51] Int. Cl.² .......................................... G05D 16/00
[52] U.S. Cl. ................................ 137/624.11; 137/82; 92/76
[58] Field of Search ...................... 137/624.11, 624.12, 137/82; 92/76

[56] References Cited

U.S. PATENT DOCUMENTS

| 3,931,832 | 1/1976 | Holder | 137/624.11 |
| 4,090,531 | 5/1978 | Laviana | 137/82 X |

FOREIGN PATENT DOCUMENTS 1673562  7/1971  Fed. Rep. of Germany ...... 137/624.11

Primary Examiner—Alan Cohan
Attorney, Agent, or Firm—Kinzer, Plyer, Dorn & McEachran

[57] ABSTRACT

This invention relates to timing devices for pneumatic signals, of the kind comprising a pneumatic motor having gearing which is brought into coupled engagement with a timer when an input signal occurs so that a control member associated with the timer, which can be set for a desired delay between the input signal and an output signal, is moved from an initial position which determines the length of delay to a terminal position which marks the end of the delay and at which the output signal is produced.

The invention consists in that a pivotable control lever is held in an initial position by means of an adjustable support and is pivotable, an occurrence of an input signal, to an intermediate position by movement of said support so that a pawl on said control lever may be allowed to come up against a track on said control member, said control member being settable in motion by said motor at the same time and in that to end the delay, said pawl drops into a recess which interrupts said track on said control member thus to break the coupled engagement, to lock said control member and to release the output signal by said control layer which pivots to its terminal position, and in that when the input signal stops, said support returns said control lever to its initial position, after releasing said locking, so that said control member can return to it initial position under the prompting of a return spring.

7 Claims, 1 Drawing Figure

TIMING DEVICE FOR PNEUMATIC SIGNALS

BACKGROUND OF THE INVENTION

The present invention relates to a timing device for pneumatic signals of the kind comprising a pneumatic motor having gearing which is brought into coupled engagement with a timer when an input signal occurs so that a control member associated with the timer, which can be set for a desired delay between the input signal and an output signal, is moved from an initial position which determines the length of delay to a terminal position which marks the end of the delay and at which the output signal is produced.

German Offenlegungsschrift No. 1 673 562 discloses an entirely pneumatically operated timing device for pneumatic signals which has a pneumatic motor. This motor has gearing which, when an input signal occurs, is brought into coupled engagement with a timer so that a control member associated with the timer, which can be set for a desired delay between the input signal and an output signal, is moved from an initial position which determines the length of delay to a terminal position which marks the end of the delay and at which the output signal is produced.

This known timing device has a number of disadvantages. Firstly, it takes up a considerable amount of space and requires a considerable amount of material, since it contains, inter alia, a switchable and thus relatively complicated clutch coupling device which drives a shaft carrying the member which changes over with a delay to produce the output signal. Also provided is an additional valve which is operated with a delay by the change-over member so as to allow the output signal to come into being. Furthermore, the arrangement for pre-selecting the delay is of rather complicated and expensive construction since it consists of a quite large toothed disc with a setting pointer and of a pinion or worm which actuates this disc and which is adjusted by a hand-operated rotary knob or the like. This means that it takes quite a long time even to set the delay. Thus, it will be understood that this known device requires a considerable number of parts and takes up a considerable amount of space. A further disadvantage is that the clutch coupling device detracts from the reliability of the device in operation since the repeatability of the pre-selected delay cannot be maintained with sufficient accuracy should slip occur.

It is an object of the invention to provide a simple and compact pneumatic timing device which is cheap to make and quick to adjust, in which in addition there is little wear and an assurance of reliability and which operates with a low level of friction.

SUMMARY OF THE INVENTION

Accordingly, in a timing device for pneumatic signals, of the kind comprising a pneumatic motor having gearing which is brought into coupled engagement with a timer when an input signal occurs so that a control member associated with the timer, which can be set for a desired delay between the input signal and an output signal, is moved from an initial position which determines the length of delay to a terminal position which marks the end of the delay and at which the output signal is produced, the invention consists in that a pivotable control lever is held in an initial position by means of an adjustable support and is pivotable, on occurrence of an input signal, to an intermediate position by movement of said support so that a pawl on said control lever may be allowed to come up against a track on said control member, said control member being settable in motion by said motor at the same time, and in that, to end the delay, said pawl drops into a recess which interrupts said track on said control member thus to break the coupled engagement, to lock said control member, and to release the output signal by said control lever which pivots to its terminal position, and in that when the input signal stops, said support returns said control lever to its initial position, after releasing said locking, so that said control member can return to its initial position under the prompting of a return spring.

With this way of achieving the object, the disadvantages set forth are overcome and a pneumatically operated timing device is provided which is simple and compact and thus cheap to make since, inter alia, there is no need for a complicated switchable coupling device, simple lever arrangements being provided instead. The device is quick to adjust since, to set the required delay, its control member can simply be shifted in opposition to a return spring without any other hindrance. In addition, there is an assurance of reliability and the desired delay is repeatable with sufficient accuracy because there is now a positive engagement in the coupling process. The device operates with low total friction and is subject to only slight wear, particularly as compared with cases where use is made of switchable couplings, which generally employ frictional engagement. A further advantage may be seen in the fact that the sum of the tolerances on the interengaging components is small, or rather its disadvantageous effects are kept small because of the special design, association and co-operation of the parts.

DETAILED DESCRIPTION OF PREFERRED EMBODIMENT

Figures 1, 2:
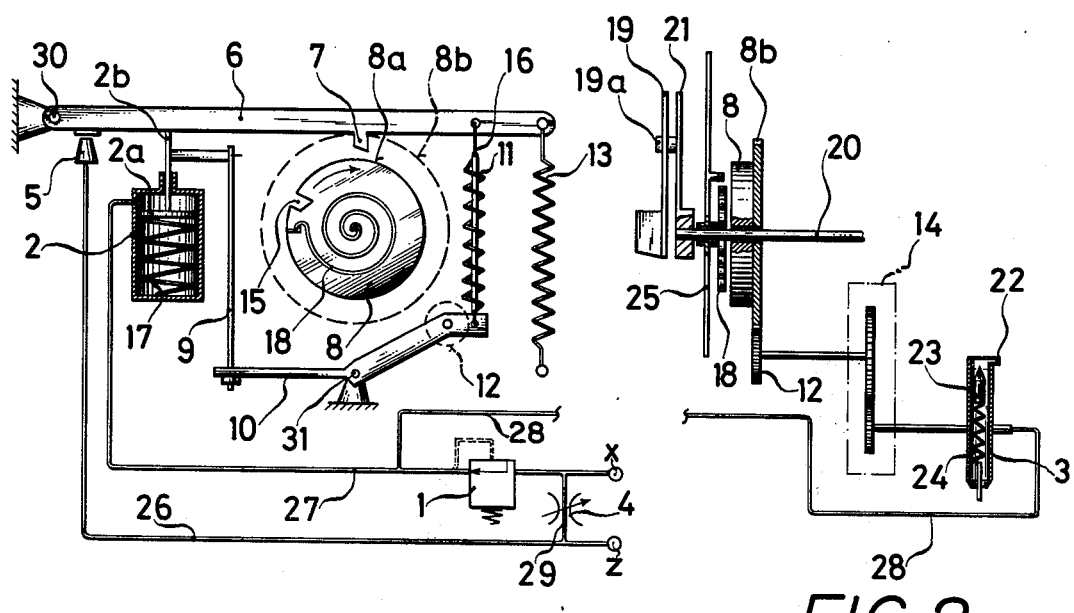
FIG. 1 is a schematic elevation view of the timing device of the present invention.
FIG. 2 is a schematic end view of the timing device, showing additional parts therefor.

The proposed timing device has a line 27 which leads from a connection x for the pneumatic input signal to a pneumatic setting member 2 which acts as a support, the line 27 having a pressure regulator 1 positioned between these two points, a line 28 which leads off from line 27 downstream of the regulator 1 to a pneumatic motor 3, and a line 26 which leads from a connection z for the pneumatic output signal to a nozzle 5. The two lines 26 and 27 are connected together upstream of the regulator 1 by a further line 29 which incorporates an adjustable constrictor 4. The setting member or support 2 comprises for example a cylinder having a piston 2a which has compressed air applied to it on one side from line 27 and is urged back on the other side by a compression spring 17, and a piston rod 2b which projects from the piston and out of the cylinder and which continually bears against a control lever 6 which is mounted to pivot at 30.

Also engaging with the part of the piston rod 2b which remains on the outside is a lever linkage 9, 10 which is mounted to pivot about a shaft 31 parallel to shaft 30. The linkage consists of a rod 9 fastened to the piston rod 2b and a cranked lever 10 which is pivotable about a shaft 31. Whereas one end of the lever 10 is connected to the rod 9, the other end is engaged by a traction spring 11 which at its other end is secured to lever 6. The other end of lever 10 also carries a pinion 12 which is driven by the motor 3. Intervening gearing 14 may be provided here as shown.

The pneumatic motor 3 which drives the gearing 14 receives compressed air as its driving power from line 28. The speed of the motor is regulated by the co-operative effect of an air outlet nozzle 22, a regulator needle 23 and a traction spring 24.

The free end of the control lever 6 engages with a traction spring 13 which continually draws the control lever towards the setting member 2 but which exerts a smaller force than the return spring 17 in the setting member, with the result that spring 17 can thrust the control lever to the initial position shown while at the same time overcoming the force exerted by the traction spring 11. The nozzle 5 mentioned above is associated with the control lever in such a way that it is closed by the control lever when the latter is in its terminal position.

Associated with the control lever 6 is a control member 8 in the form of a control disc fixed to a rotary shaft 20, which has a circumferential track 8a with a recess 15 provided in it, the association being such that a control pawl 7 which is preferably provided on the control lever 6 engages in the recess when the control lever is in its terminal position, as will be explained below. The control disc 8 also has teeth 8b at the circumference with which the pinion 12 can be brought into engagement when the cranked lever 10 is pivoted. Solidly connected to the rotary shaft 20 or the control disc is a spiral return spring 18 for the control disc, which at the other end is connected to a fixed time scale 25 for example. Shaft 20 also carries a pointer 21 fixed to it and this has provided for it a setting pointer 19 which can be operated by a rotary knob and a stop 19a on pointer 21 allows the required delay to be set manually. The action of the return spring is continuously in the opposite direction from the direction of rotation of the control disc as the desired period of delay runs down.

The operation of the timing device described above is explained in what follows.

FIG. 1 shows the device in its initial position. When a pneumatic input signal reaches connection x, it passes on the one hand via constrictor 4 to the open nozzle 5, where at first it can flow out to free air, and on the other, after passing through regulator 1, to the setting member 2 and the motor 3, which then sets the pinion 12 on the cranked lever 10 in rotation via the gearing 14. At the same time the piston 2a is lowered in opposition to spring 17 so that the cranked lever 10 is pivoted by means of rod 9, as a result of which pinion 12 comes into engagement with the teeth 8b on the circumference of the control disc 8 and drives the disc in the direction of the arrow. At the same time also, the control lever 6 is drawn towards the control disc by the traction spring 13, where its control pawl first of all comes to bear against the track 8a on the rotating disc in an intermediate position. The lever 6 can descend because the piston rod 2b of the setting member 2 has been lowered.

When the delay which had been set on the time scale 25 using the pointer 19 has expired, and the control disc 8, which was adjusted correspondingly, has run down, the recess 15 in the track on the control disc is situated opposite the pawl 7 of the control lever, which immediately engages in the recess. As a result the nozzle 5 which was exhausting to free air is closed off and an output signal then arises at connection z. At the same time as the pawl 7 engages in the recess 15, whereby the control lever 6 reaches its terminal position, cranked lever 10 is pivoted back by a setting rod mounted in traction spring 11, the rod being pressed against the corresponding end of the cranked lever by lever 6 and the pinion 12 thus being disengaged from the teeth 8b of the control disc.

If the input signal at connection x ceases, which means that the output signal also ceases, at the same time the motor 3 is stopped and the piston rod 2b extended by the action of the return spring 17 in the setting member 2, as a result of which the control lever 6 moves back to its initial position as shown, overcoming the force exerted by the traction spring as it does so. In this position the nozzle 5 is open again and the pawl 7 is unlatched from the recess 15 in the control disc 8, so that the spiral return spring 18 turns the control disc back, as dictated by the length of delay which has been preset, and the proposed timing device again takes up its starting position.

I claim:

1. A timing device for pneumatic signals, capable of producing an output in response to an input signal, with a selectable delay between signals, said device comprising:
   (a) a moveable control member having a track and a recess in the track;
   (b) a control lever, pivotable between initial, intermediate and terminal positions and having a pawl attached thereto;
   (c) a pneumatic motor;
   (d) gear means engageable between the motor and control member for driving the control member;
   (e) a linkage between the control lever and gear means;
   (f) an adjustable support for holding the control lever in its initial position and the gear means in a non-engaged relation, the support being responsive to an input signal to engage the gear means and cause the control lever to assume its intermediate position wherein the pawl means engages the track of the control member, with control member motion eventuating in alignment of the pawl and recess whereupon the control lever drops into its terminal position where it disengages the gear means and causes creation of an output signal.

2. The structure of claim 1 further comprising a return spring which biases the control member toward an initial position and wherein, upon release of the input signal, the adjustable support returns the control lever to its initial position removing the pawl from the recess which allows the control member to regain its initial position under the urging of the return spring.

3. The structure of claim 1 further comprising:
   a pointer connected to the control member and adjustable to locate the initial position of the control member, thereby adjusting the initial separation between the pawl and recess, and
   a time scale located behind the timer for indicating the time delay corresponding to the selected pawl-recess separation.

4. The structure of claim 1 wherein the control member is in the form of a control disc mounted on a rotary shaft, the circumference of the disc forming the track which is interrupted by the recess, the control disc having teeth which mesh with the gear means when the gear means is engaged, to cause rotation of the control disc.

5. The structure of claim 4, wherein the control lever is mounted to pivot at one end thereof and, when in its initial position, is supported by the piston rod of a pneumatic setting member constituting the adjustable support, the piston of the setting member having the input signal, or a setting force derived therefrom, applied to one of its sides and a resetting force from a compression spring applied to the other, and wherein, when the input signal appears, the piston, and thus the piston rod, perform a movement resulting in the control lever pivoting so as to bring the pawl into contact with the track on the control disc, while at the same time the gear means comes into engagement with the teeth of the control disc via a lever linkage connected to the piston rod.

6. The structure of claim 1 wherein the input signal is fed to a signal output line, one end of which terminates in a nozzle directed toward the control lever, through which nozzle the compressed air escapes to free air when the control lever is in the initial and intermediate position, and wherein the nozzle has a mouth closed by the control lever as soon as the pawl drops into the recess in the control member so that the output signal will become available at the other end of the signal output line as a result of the buildup in back pressure.

7. The structure of claim 6 wherein the signal is fed to the signal output line via a constrictor device.

* * * * *